US008056538B2

(12) United States Patent
Harnack et al.

(10) Patent No.: US 8,056,538 B2
(45) Date of Patent: Nov. 15, 2011

(54) METHOD AND SYSTEM TO PREVENT UNAUTHORIZED USES OF ENGINE CONTROLLERS

(75) Inventors: Donald W. Harnack, Livonia, MI (US); Anthony E. Cubr, Fenton, MI (US); Sandip P Dholakia, Northville, MI (US); Steven B Felix, Davisburg, MI (US); Aaron T Allison, East Palestine, OH (US)

(73) Assignee: GM Global Technology Operations LLC

( * ) Notice: Subject to any disclaimer, the term of this patent is extended or adjusted under 35 U.S.C. 154(b) by 441 days.

(21) Appl. No.: 12/326,535

(22) Filed: Dec. 2, 2008

(65) Prior Publication Data

US 2010/0138133 A1 Jun. 3, 2010

(51) Int. Cl.
*F02M 51/00* (2006.01)
*G05B 19/00* (2006.01)

(52) U.S. Cl. ........ 123/479; 701/102; 701/114; 701/115; 340/5.2; 340/5.31

(58) Field of Classification Search .................. 123/479, 123/480, 198 D, 198 DB; 701/102, 106, 701/107, 112, 114, 115; 340/426.11, 426.13–426.17, 340/426.35, 426.2, 438, 531, 533, 534, 5.2, 340/5.3
See application file for complete search history.

(56) References Cited

U.S. PATENT DOCUMENTS

| | | | | |
|---|---|---|---|---|
| 4,107,543 | A * | 8/1978 | Kaplan | 307/10.4 |
| 4,642,631 | A * | 2/1987 | Rak | 340/5.26 |
| 4,758,835 | A * | 7/1988 | Rathmann et al. | 340/5.26 |
| 4,819,050 | A * | 4/1989 | Manzoni | 340/425.5 |
| 4,887,064 | A * | 12/1989 | Drori et al. | 340/5.23 |
| 5,172,094 | A * | 12/1992 | Stadler | 340/426.11 |
| 5,229,648 | A * | 7/1993 | Sues et al. | 307/10.2 |
| 5,440,177 | A * | 8/1995 | Bellin et al. | 307/10.5 |
| 5,473,200 | A * | 12/1995 | Woo | 307/10.2 |
| 5,513,105 | A * | 4/1996 | Krones | 701/48 |
| 5,523,948 | A * | 6/1996 | Adrain | 701/99 |
| 5,539,377 | A * | 7/1996 | Dillon | 340/426.11 |
| 5,583,383 | A * | 12/1996 | Denz et al. | 307/10.2 |
| 5,592,881 | A * | 1/1997 | Rabjohns | 101/483 |
| 5,675,490 | A * | 10/1997 | Bachhuber | 701/32 |
| 5,684,338 | A * | 11/1997 | Linton et al. | 307/10.2 |
| 5,703,413 | A * | 12/1997 | Treharne | 307/10.5 |
| 5,815,087 | A * | 9/1998 | Campbell et al. | 340/5.6 |
| 6,424,253 | B1 * | 7/2002 | Shen | 340/426.11 |
| 6,573,827 | B1 * | 6/2003 | McKenzie | 340/438 |
| 6,788,189 | B2 * | 9/2004 | Kikkawa et al. | 340/426.1 |
| 6,799,106 | B2 * | 9/2004 | Fukushima et al. | 701/48 |
| 7,274,977 | B2 * | 9/2007 | Frashure | 701/2 |
| 7,286,917 | B2 * | 10/2007 | Hawkins et al. | 701/34 |
| 7,729,813 | B2 * | 6/2010 | Frashure | 701/1 |
| 7,873,455 | B2 * | 1/2011 | Arshad et al. | 701/50 |
| 2009/0091419 | A1 * | 4/2009 | Alrabady et al. | 340/5.2 |

* cited by examiner

*Primary Examiner* — Thomas Moulis

(57) ABSTRACT

A method and control module for enabling or disabling control of an engine includes a check module receiving signals through a wiring harness and comparing the check signals to a threshold. The control module also includes an engine control module disabling the engine when the check signals correspond to an unauthorized use.

20 Claims, 4 Drawing Sheets

METHOD AND SYSTEM TO PREVENT UNAUTHORIZED USES OF ENGINE CONTROLLERS

FIELD OF THE INVENTION

The present disclosure relates to internal combustion engines, and more particularly to a method and system to prevent unauthorized uses of an engine controller.

BACKGROUND

Original equipment manufacturers offer high performance after-market components such as engine and transmission assemblies. These typically include complete current production engines. Customers include classic car owners and restoration enthusiasts who replace older engines with newer versions. By providing current engine and transmission assemblies, utilization of the engine manufacturing facility is increased and excess production capacity is used. Typically, the engine provided is more powerful than older versions of engines. After-market engines are typically used by enthusiasts such as in classic cars of off-road vehicles.

Currently, most engines are not provided with controllers and thus the customers must purchase and calibrate after-market control systems. Many times the owners do not perform proper calibration and thus the engines do not perform as desired. Misfueled or mistimed conditions are problematic. Further, miscalibrated engines may also eventually cause damage to the engines.

In standard original equipment manufacturer vehicles, a controller is provided with the engine. The controller is provided with antitheft features to prevent the vehicle from operating when the vehicle has been stolen. Antitheft provisions in after-market controllers must be disabled since the various interfacing modules are not present. However, providing an after-market controller with an after-market engine may allow the after-market controller to be used for unauthorized applications in current vehicles to circumvent antitheft provisions in the controllers present.

SUMMARY

The present disclosure provides a method and system for enabling the use of an after-market engine controller when certain checks have been completed. If the check signals are not proper, then an engine control module may be disabled.

In one aspect of the disclosure, a method of checking an electronic control module associated with an engine includes receiving check signals through a wiring harness at the electronic control module, comparing the check signals to a threshold, when the check signals correspond to an unauthorized use, disabling an engine control module of the electronic control module.

In another aspect of the disclosure, a control module for enabling or disabling control of an engine includes a check module receiving signals through a wiring harness and comparing the check signals to a threshold. The control module also includes an engine control module disabling the engine when the check signals correspond to an unauthorized use.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
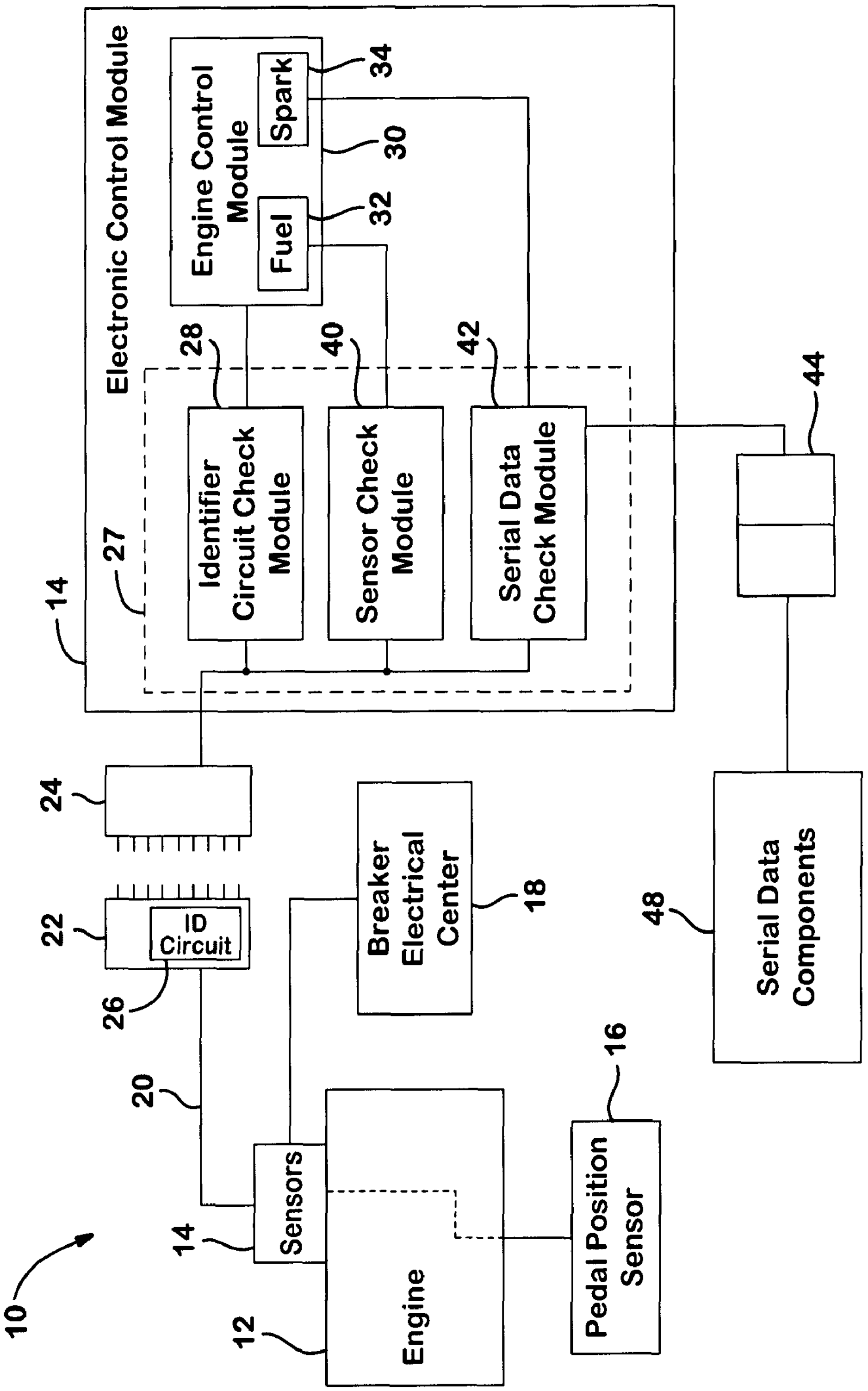
FIG. 1 is a functional block diagram illustrating an exemplary vehicle including an engine and electronic control module.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a vehicle 10 includes an engine 12 and an electronic control module 14. The engine 10 may include a plurality of sensors 14 that are used to monitor various conditions of the vehicle. The sensors may include, but are not limited to, a mass airflow sensor, an exhaust gas oxygen sensor, a crankshaft position sensor, a manifold absolute pressure sensor, temperature sensors, and the like. The engine 10 may also include a pedal position sensor 16 used for electronic throttle control. A breaker electrical center (BEC) 18 may also be associated with the engine 12 and sensors 14. The breaker electrical center 18 may provide circuit breakers for breaking the circuits to various electrical circuits within the engine compartment, such as those associated with the sensors 14.

The sensors 14 and other engine components may be coupled through a wiring harness 20 and through one or more connectors, one of which is illustrated as reference numeral 22. A complimentary connector 24 may also be associated with the electronic control module 24.

An identifier circuit 26 may be associated with the connector 22. The identifier circuit 26 may provide various identifying information such as a code or other type of check signal.

The electronic control module 14 may include a check circuit module 27 having an identifier circuit module 28 that checks to determine if the check signal or identifier signal in the identifier circuit 26 is a proper code or authorized used. When the check signal indicates an authorized use, the engine control module 30 enables a fuel module 32 to provide fuel to the engine and a spark module 34 to provide spark to the engine. A threshold for comparison may be the code itself. When the ID code meets the threshold, proper use is found. When the ID code is not equivalent to the threshold, then improper use is found. The fuel module 32 and the spark module 34 may be used together or alone. Thus, by disabling one of the fuel module 32 or the spark module 34, the engine 12 may be disabled.

A sensor check module 40 may also be provided in the check circuit module 27 of the electronic control module 14.

The sensor check module 40 may use various sensors as check signals within the engine 12. For example, the sensor check module 40 may detect sensor signals to determine whether the controller has been installed in a modern vehicle. When more modern sensors are provided, the sensor check module 40 may not allow the engine control module 30 to enable the fuel module 32 and spark module 34. A modern versus non-modern threshold may be established in various ways including determining whether a particular sensor or sensors are present. Of course, this may be determined based on the vehicle or engine.

The electronic control module 14 may also include a serial data check module 42. The serial data check module 42 may have a connector 44 that connects the serial data check module 42 and thus the electronic control module 14 to a serial data bus 46. The serial data bus 46 is in communication with the serial data components 48. Examples of serial data components are operator-supplied test tools or data-logging devices. The serial data check module 42 may also receive check signals from the serial data bus 46. The serial data check module determines whether signals are present that should not be present in an older vehicle. More recent serial data signals are identified and allow the serial data check module 42 to enable the engine control module 30 through fuel and spark. Certain data signals should not be present in a classic or older vehicle. When these serial data signals are not present, the engine control module enables the fuel and spark. In this example, present or not present is the threshold. If serial data components generate serial data signals on the serial data bus 46 that indicate the vehicle is a newer vehicle, then the engine control module may disable the fuel and spark modules 32, 34.

Figure 2:
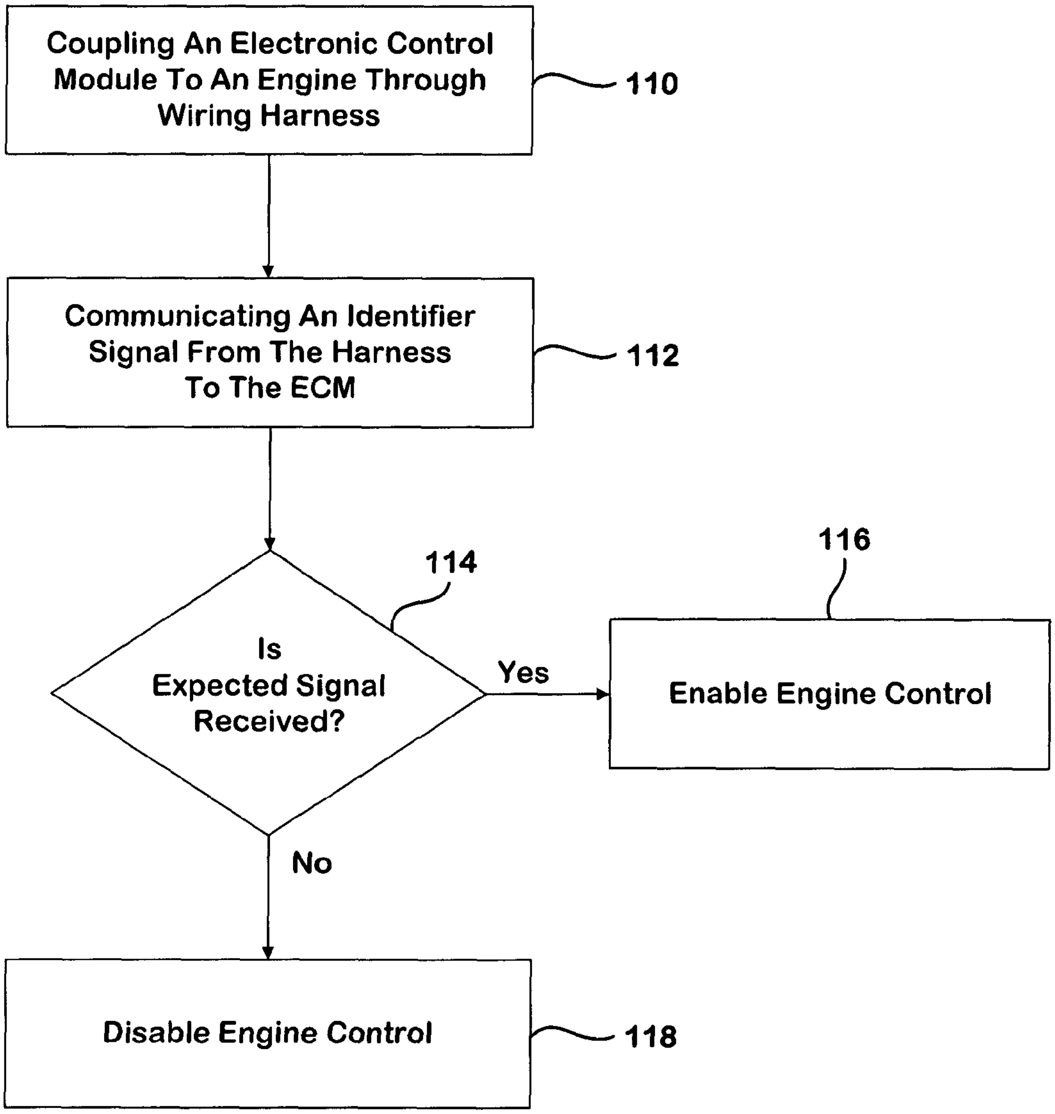
FIG. 2 is a flowchart of a method for enabling or disabling the engine in response to identifier signals.

Referring now to FIG. 2, a first method of enabling or disabling an engine control is set forth. In step 110, an electronic control module is coupled to an engine through a wiring harness. The identifier signal may originate in the engine connector. In step 112, an identifier signal from the harness is communicated to the electronic control module. The identifier signal may be referred to as a check signal. The identifier signal may take many forms including a coded signal having a specific code or a signal that includes certain identifiers such as a serial number, a model number, a model year, or any combination thereof.

In step 114, the received signal is compared to data within the identifier circuit module 28 of FIG. 1. A direct comparison may take place in step 114 such as comparing the identifier signal to an identifier stored within the identifier circuit module. When the two are equal, the signal is an expected signal. The stored identifier acts as a threshold. The signal may also look at a model year of the model year received in the identifier signal. When the model year is equal to an expected model year or greater, the identifier circuit control module may communicate with the engine control module 30. In summary, when the signal received through the wiring harness is an expected signal, step 116 enables the engine control module. In step 114 when the signal is not expected, meaning the proper identifier is not received as a check signal, then the engine control may be disabled in step 118.

Figure 3:
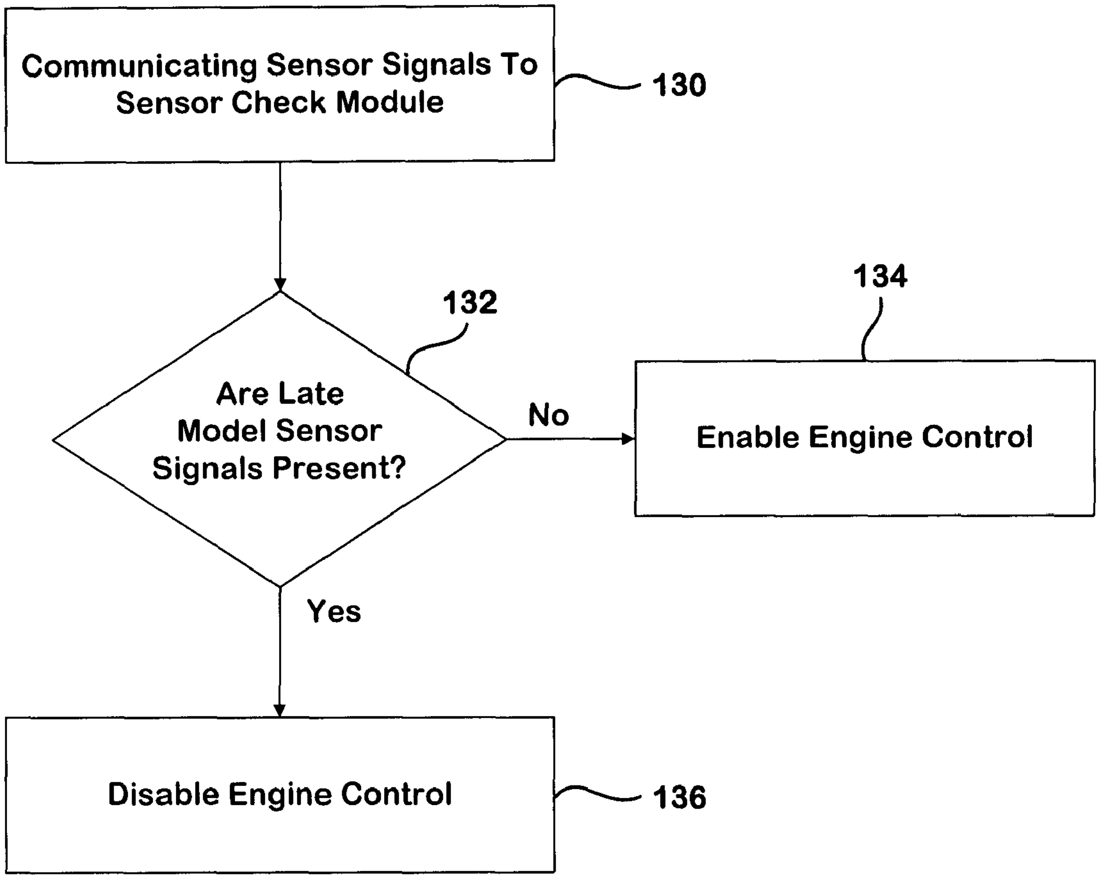
FIG. 3 is a flowchart of a method for enabling or disabling an engine in response to various sensor signals.

Referring now to FIG. 3, another method associated with the check module of electronic control module and specifically the sensor check module 40 of FIG. 1 is provided. In step 130, sensor signals are communicated to the electronic control module, and more specifically to the sensor check module. The sensor signals are communicated through a harness. In step 132, a comparison of the sensor signals is performed. When the sensor signals are not late-model sensor signals, step 134 enables engine controls such as fuel and spark to be operated. Referring back to step 132, when late-model sensor signals are present, engine controls are disabled in step 136. Late-model sensor signals may provide an indication that the controller is used for theft of a newer vehicle and thus the engine control such as fuel and spark may be disabled.

Figure 4:
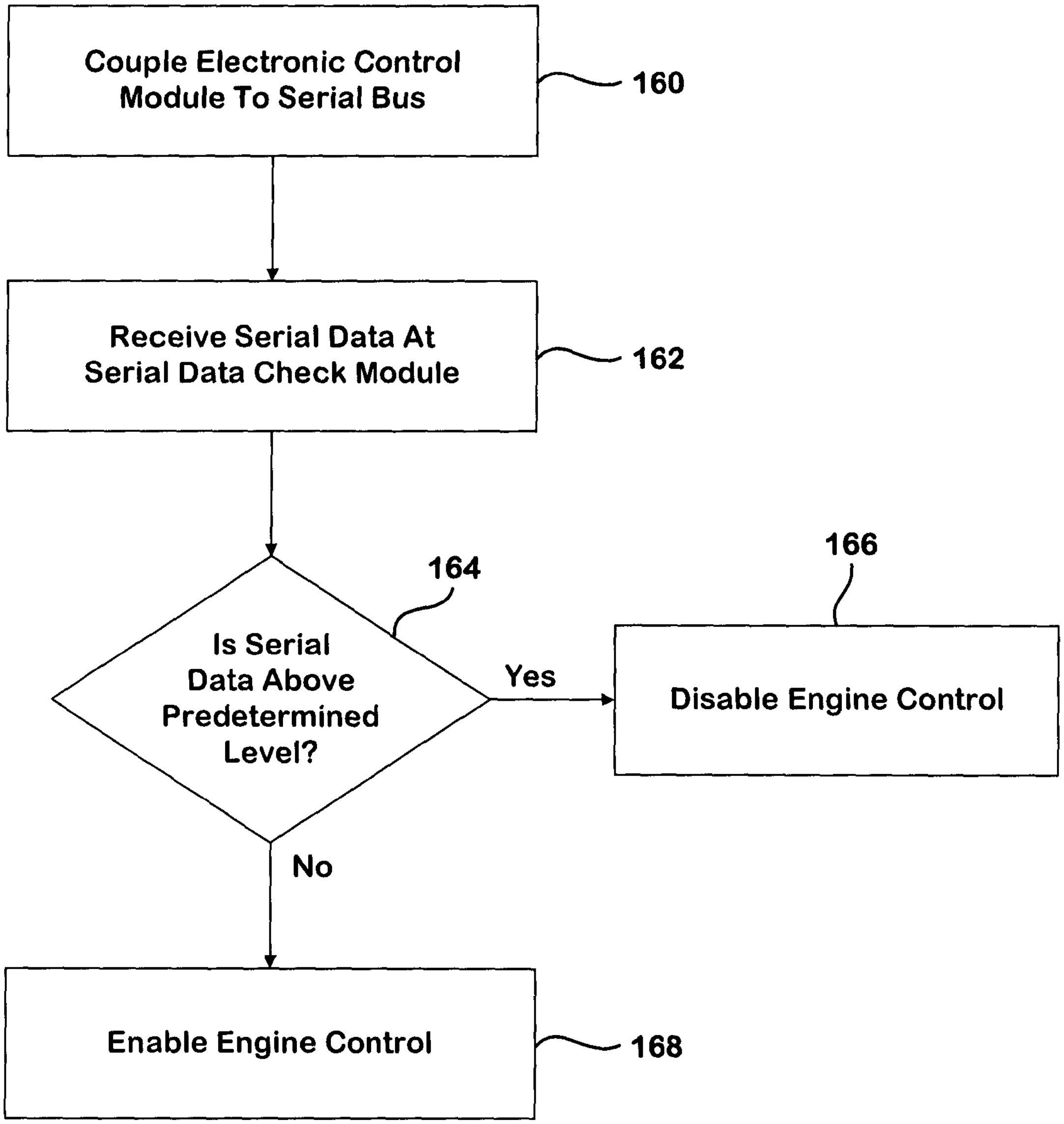
FIG. 4 is a flowchart of a method for enabling or disabling an engine control based upon serial data.

Referring now to FIG. 4, a method using serial bus data is set forth. In step 160, the electronic control module is coupled to a serial bus within the vehicle 10 of FIG. 1. In step 162, serial data is received at the serial data check module 42 illustrated in FIG. 1. In step 164, if the serial data is above threshold level, step 166 disables the engine control. Step 164 determines whether the serial data signal present indicates that the vehicle is a newer vehicle and not an older vehicle suitable for engine replacement. When the serial data is newer serial data, certain newer serial data signals may be present on the serial bus. Thus, when newer data is present, the engine control may be disabled by disabling the fuel and spark in step 166.

In step 164, when the serial data is not above a predetermined level, meaning the serial data signals are only older-type signals, the engine control will be enabled. As mentioned above, engine control enablement may allow enablement of both the fuel and spark.

It should be noted that the methods set forth in FIGS. 2-4 may be implemented alone or in any combination. Thus, the check signals may be an identifier signal, a sensor signal or plurality of sensor signals and serial data signals, or any combination thereof.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A method of checking an electronic control module associated with an engine comprising:

receiving check signals through a wiring harness at the electronic control module;

comparing the check signals to a threshold model year; and when the check signals correspond to a year that is later than the threshold model year, disabling an engine control module of the electronic control module.

2. A method as recited in claim 1 wherein receiving check signals comprises receiving identifier signals from an identifier circuit in an engine connector.

3. A method as recited in claim 1 wherein receiving check signals comprises receiving check signals through an engine wiring harness.

4. A method as recited in claim 1 wherein receiving check signals comprises receiving sensor signals from sensors associated with the engine through the wiring harness.

5. A method as recited in claim 1 wherein receiving check signals comprises receiving serial data bus signals.

6. A method as recited in claim 1 wherein receiving check signals comprises receiving least two of identifier signals from an identifier circuit in an engine connector, sensor signals from sensors associated with the engine through the wiring harness and serial data bus signals.

7. A method as recited in claim 1 wherein disabling an engine control module comprises disabling fuel delivery.

8. A method as recited in claim 1 wherein disabling an engine control module comprises disabling spark delivery.

9. A method as recited in claim 1 wherein disabling an engine control module comprises disabling spark delivery and fuel delivery.

10. A control module for enabling or disabling control of an engine comprising:

a check module receiving check signals through a wiring harness and comparing the check signals to a threshold model year;

an engine control module disabling the engine when the check signals correspond to a year later than the threshold model year.

11. A control module as recited in claim 10 further comprising an engine connector, said check module receiving the check signals from an identifier circuit in an engine connector.

12. A control module as recited in claim 10 wherein further comprising an engine wiring harness communicating check signals therethrough.

13. A control module as recited in claim 10 wherein the check signals comprise sensor signals from sensors associated with the engine.

14. A control module as recited in claim 10 wherein the check signals comprises serial data bus signals.

15. A control module as recited in claim 10 wherein check signals comprise at least two of identifier signals from an identifier circuit in an engine connector, sensor signals from sensors associated with the engine through the wiring harness and serial data bus signals.

16. A control module as recited in claim 10 wherein the engine control module disables fuel delivery.

17. A control module as recited in claim 10 wherein the engine control module disables spark delivery.

18. A control module as recited in claim 10 wherein the engine control module disables spark delivery and fuel delivery.

19. A control module as recited in claim 10 wherein the threshold comprises an unauthorized use threshold.

20. A system comprising:

an engine;

a control module as recited in claim 10; and a wiring harness coupling the engine and the control module.

* * * * *